(12) United States Patent
O'Keeffe et al.

(10) Patent No.: US 9,984,050 B2
(45) Date of Patent: May 29, 2018

(54) GROUND TRUTH COLLECTION VIA BROWSER FOR PASSAGE-QUESTION PAIRINGS

(71) Applicant: International Business Machines Corporation, Armonk, NY (US)

(72) Inventors: William G. O'Keeffe, Tewksbury, MA (US); David D. Taieb, Charlestown, MA (US); Cale R. Vardy, East York (CA)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 14/955,702

(22) Filed: Dec. 1, 2015

(65) Prior Publication Data
US 2017/0154015 A1  Jun. 1, 2017

(51) Int. Cl.
| | | |
|---|---|---|
| G06F 13/00 | (2006.01) |
| G06F 15/00 | (2006.01) |
| G06F 17/22 | (2006.01) |
| G06F 3/0481 | (2013.01) |
| G06F 3/0484 | (2013.01) |
| G06F 17/28 | (2006.01) |
| G06N 5/02 | (2006.01) |
| G06F 17/30 | (2006.01) |

(52) U.S. Cl.
CPC ........ *G06F 17/2247* (2013.01); *G06F 3/0484* (2013.01); *G06F 3/04812* (2013.01); *G06F 17/28* (2013.01); *G06F 17/30893* (2013.01); *G06N 5/022* (2013.01)

(58) Field of Classification Search
CPC ................ H04L 41/5009; G06F 17/30873

USPC ................ 715/763–765, 740, 780, 851–853
See application file for complete search history.

(56) References Cited

U.S. PATENT DOCUMENTS

| | | | |
|---|---|---|---|
| 8,832,584 B1 | 9/2014 | Agarwal et al. | |
| 2007/0234209 A1 | 10/2007 | Williams | |
| 2013/0219259 A1* | 8/2013 | Wilhelm | G06F 17/30873 715/234 |
| 2014/0297571 A1 | 10/2014 | Beamon et al. | |
| 2016/0099846 A1* | 4/2016 | Allen | H04L 41/5009 709/223 |

OTHER PUBLICATIONS

R. High, "The Era of Cognitive Systems: An Inside Look at IBM Watson and How it Works," IBM Redbooks, 2012.
Yuan et al., "Watson and Healthcare," IBM developerWorks, 2011.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717.

* cited by examiner

*Primary Examiner* — Kevin Nguyen
(74) *Attorney, Agent, or Firm* — Terrile, Cannatti, Chambers & Holland, LLP; Michael Rocco Cannatti

(57) ABSTRACT

A method, system and a computer program product are provided for collecting ground truth data by activating a ground truth collection browser plugin with a designated toolbar button to receive answer data from a webpage which includes user-selected data passage and source data from the webpage for automatic loading into a ground truth submission window along with user input question data corresponding to the answer data so that the user input question data, source data, and answer data from the ground truth submission window may be stored as ground truth data.

21 Claims, 7 Drawing Sheets

GROUND TRUTH COLLECTION VIA BROWSER FOR PASSAGE-QUESTION PAIRINGS

BACKGROUND OF THE INVENTION

In the field of artificially intelligent computer systems capable of answering questions posed in natural language, cognitive question answering (QA) systems (such as the IBM Watson™ artificially intelligent computer system or and other natural language question answering systems) process questions posed in natural language to determine answers and associated confidence scores based on knowledge acquired by the QA system. To train such QA systems, a subject matter expert (SME) presents ground truth data in the form of question-answer-passage (QAP) triplets or answer keys to a machine learning algorithm. Typically derived from fact statements submissions to the QA system, such ground truth data is expensive and difficult to collect. Conventional approaches for collecting ground truth data might include a user to be trained on a specific ground truth collection application in which documents are pre-loaded before a question is presented, or the flow may be reversed so that a question is created first, followed by document loading in the application. Thus, while there are a variety of existing ground truth tools, each operates in a different way, often requiring dedicated software and separate training which imposes costs on the ground truth collection process. As a result, the existing solutions for efficiently generating ground truth data are extremely difficult at a practical level.

SUMMARY

Broadly speaking, selected embodiments of the present disclosure provide a ground truth collector system, method, and apparatus for seamlessly generating ground truth data at any website by providing an embeddable overlay into any web site that users can access from any page to highlight passages and send them to a ground truth data store with a click of a button. In selected embodiments, the ground truth collector may be implemented with a browser plugin which is embedded in the browser toolbar. Upon activation, the browser plugin may be configured to make suggestion to a user, such as a subject matter expert, based on the user's area of expertise which can be configured manually via preferences or inferred by the tool via cognitive algorithms which are adapted to detect SME habits (e.g., type of site being navigated to, type of previous answer key submission). In addition, the browser plugin may be configured to automatically provide a text selection tool for automatically feeding the selected text and associated source information into predetermined answer and source fields of a ground truth submission window. In addition, the ground truth submission window may include a question field in which the user may also submit a corresponding question for pairing with the answer and/or source information. Information assembled in the ground truth submission window may be automatically sent to a ground truth storage where a domain expert or system knowledge expert can review and evaluate proposed ground truth submissions for inclusion in one or more corpora.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
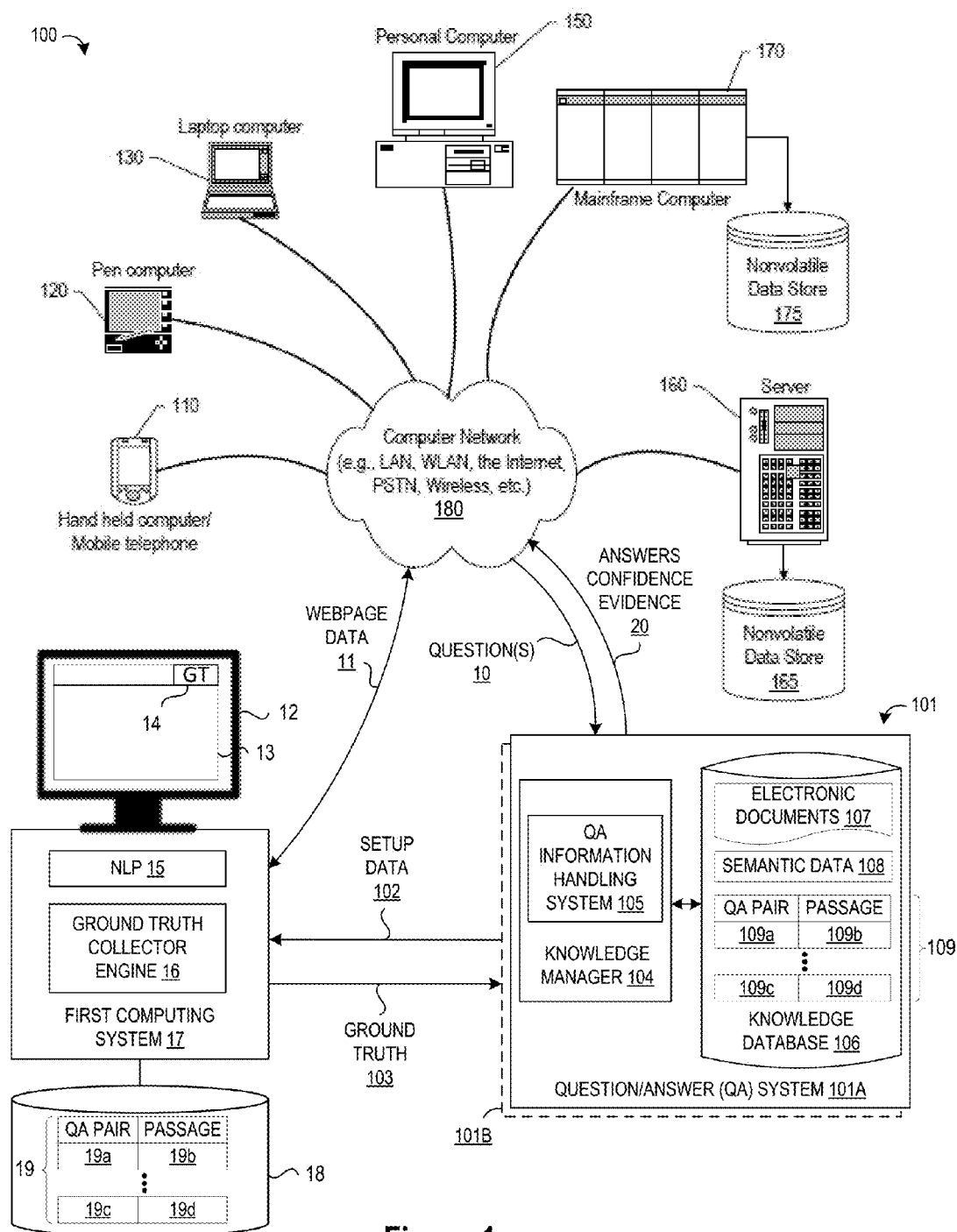
FIG. 1 depicts a system diagram that includes a QA system connected in a network environment to a computing system that uses a browser-based ground truth collector engine to generate ground truth data.

The present invention may be a system, a method, and/or a computer program product, in addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention. Thus embodied, the disclosed system, a method, and/or a computer program product is operative to improve the functionality and operation of a cognitive question answering (QA) systems by efficiently providing ground truth data for improved training and evaluation of cognitive QA systems.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram 100 of one illustrative embodiment of a question/answer (QA) system 101 directly or indirectly connected to a first computing system 17 that uses a ground truth collector engine 16 to identify and collect ground truth data 19 (e.g., question answer pairs or question-answer-passage triplets) for training and evaluation of the QA system 101. The QA system 101 may include one or more QA system pipelines 101A, 101B, each of which includes a knowledge manager computing device 104 (comprising one or more processors and one or more memories, and potentially any other computing device elements generally known in the art including buses, storage devices, communication interfaces, and the like) for processing questions received over the network 180 from one or more users at computing devices (e.g., 110, 120, 130). Over the network 180, the computing devices communicate with each other and with other devices or components via one or more wired and/or wireless data communication links, where each communication link may comprise one or more of wires, routers, switches, transmitters, receivers, or the like. In this networked arrangement, the QA system 101 and network 180 may enable question/answer (QA) generation functionality for one or more content users. Other embodiments of QA system 101 may be used with components, systems, subsystems, and/or devices other than those that are depicted herein.

In the QA system 101, the knowledge manager 104 may be configured to receive inputs from various sources. For example, knowledge manager 104 may receive input from the network 180, one or more knowledge bases or corpora 106 of electronic documents 107, semantic data 108, or other data, content users, and other possible sources of input. In selected embodiments, the knowledge base 106 may include structured, semi-structured, and/or unstructured content in a plurality of documents that are contained in one or more large knowledge databases or corpora. The various computing devices (e.g., 110, 120, 130) on the network 180 may include access points for content creators and content users. Some of the computing devices may include devices for a database storing the corpus of data as the body of information used by the knowledge manager 104 to generate answers to cases. The network 180 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in an electronic document 107 for use as part of a corpora 106 of data with knowledge manager 104. The corpora 106 may include any structured and unstructured documents, including but not limited to any file, text, article, or source of data (e.g., scholarly articles, dictionary definitions, encyclopedia references, and the like) for use in knowledge manager 104. Content users may access knowledge manager 104 via a network connection or an Internet connection to the network 180, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question 10. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions 10 (e.g., natural language questions, etc.) to the knowledge manager 104. Knowledge manager 104 may interpret the question and provide a response to the content user containing one or more answers 20 to the question 10. In some embodiments, knowledge manager 104 may provide a response to users in a ranked list of answers 20.

In some illustrative embodiments, QA system 101 may be the IBM Watson™ QA system available from International Business Machines Corporation of Armonk, N.Y., which is augmented with the mechanisms of the illustrative embodiments described hereafter. The IBM Watson™ knowledge manager system may receive an input question 10 which it then parses to extract the major features of the question, that in turn are then used to formulate queries that are applied to the corpus of data stored in the knowledge base 106. Based on the application of the queries to the corpus of data, a set of hypotheses, or candidate answers to the input question, are generated by looking across the corpus of data for portions of the corpus of data that have some potential for containing a valuable response to the input question.

In particular, a received question 10 may be processed by the IBM Watson™ QA system 101 which performs deep analysis on the language of the input question 10 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e., candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 101 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In addition to providing answers to questions, QA system 101 is connected to at least a first computing system 17 having a connected display 12 and memory or database storage 18 for identifying and collecting ground truth data 19, which may take the form of one or more QA pairs 19a, 19c and/or associated passages 19b, 19d, which may be used to train the QA system 101. Though shown as being directly connected to the QA system 101, the first computing system 17 may be indirectly connected to the QA system 101 via the computer network 180. Alternatively, the functionality described herein with reference to the first computing system 17 may be embodied in or integrated with the QA system 101. To train the QA system 101, the first computing system 17 may be configured to collect and store ground truth data 19 (e.g., as question-answer pairs 19a, 19c) in the memory/database storage 18, alone or in combination with associated passage or source document identification data (e.g., 19b, 19d). To efficiently collect the ground truth data 19, the first computing system 17 may be configured to access one or more websites using a search engine functionality or other network navigation tool to access one or more remote websites over the network 180 in order to locate information (e.g., an answer to a question). In selected embodiments, the search engine functionality or other network navigation tool may be embodied as part of a ground truth collector engine 16 which exchanges webpage data 11 using any desired Internet transfer protocols for accessing and retrieving webpage data, such as HTTP or the like. At an accessed website, the user may identify ground truth data that should be collected for addition to a specified corpus, such as an answer to a pending question, or a document (or document link) that should be added to the corpus.

To collect the ground truth data, the ground truth collector engine 16 may be configured to include an embedded ground truth (GT) overlay 14 that is included with any displayed web site 13. For example, the user can manipulate a cursor or otherwise select the GT overlay button 14 on the displayed page 13 to activate a text selection functionality to highlight or select a passage from the displayed page for collection as ground truth data 19 to be stored in the memory/database storage 18. In selected embodiments, the ground truth collector engine 16 may be implemented with a browser plugin in which the GT overlay button 14 is embedded in the browser toolbar. For example, the activated browser plugin may be configured to automatically provide a text selection tool for capturing the selected text and associated source information into predetermined answer and source fields of a ground truth submission window which may also include a question field in which the user may also submit a corresponding question. Information assembled in the ground truth submission window may be automatically sent as ground truth data 103 for storage in the knowledge database 106 as stored ground truth data 109 where a domain expert or system knowledge expert can review and evaluate proposed ground truth submissions for inclusion in one or more corpora.

In selected embodiments, the ground truth collector engine 16 may receive setup data 102 from the QA system 101 which identifies unanswered questions in the existing ground truth store 109 requiring answers and/or source data. In other embodiments, the setup data 102 may also identify website pages that have already been accessed by other users along with indications for previously annotated passages on each page which may include an identification of the other user(s). In other embodiments, the setup data 102 may prompt the ground truth collector engine 16 to automatically display or "pop-up" a ground truth submission window when the user navigates to a website page that may have a good answer for an existing question in the stored ground truth 109. If desired, user preferences may be set to permit the display of the ground truth submission window only for questions that have not already been answered or to allow the window to be displayed for answered questions also. Conversely, the ground truth collector engine 16 may be configured to compare answers already given in the ground truth data (e.g., 19*a*) with answer data retrieved from an accessed website for purposes of validating the stored answer(s) with extra evidence or contradicting the stored answer(s), at which point a score could be calculated for the stored answer(s).

Types of information handling systems that can utilize QA system 101 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 180. Types of computer network 180 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
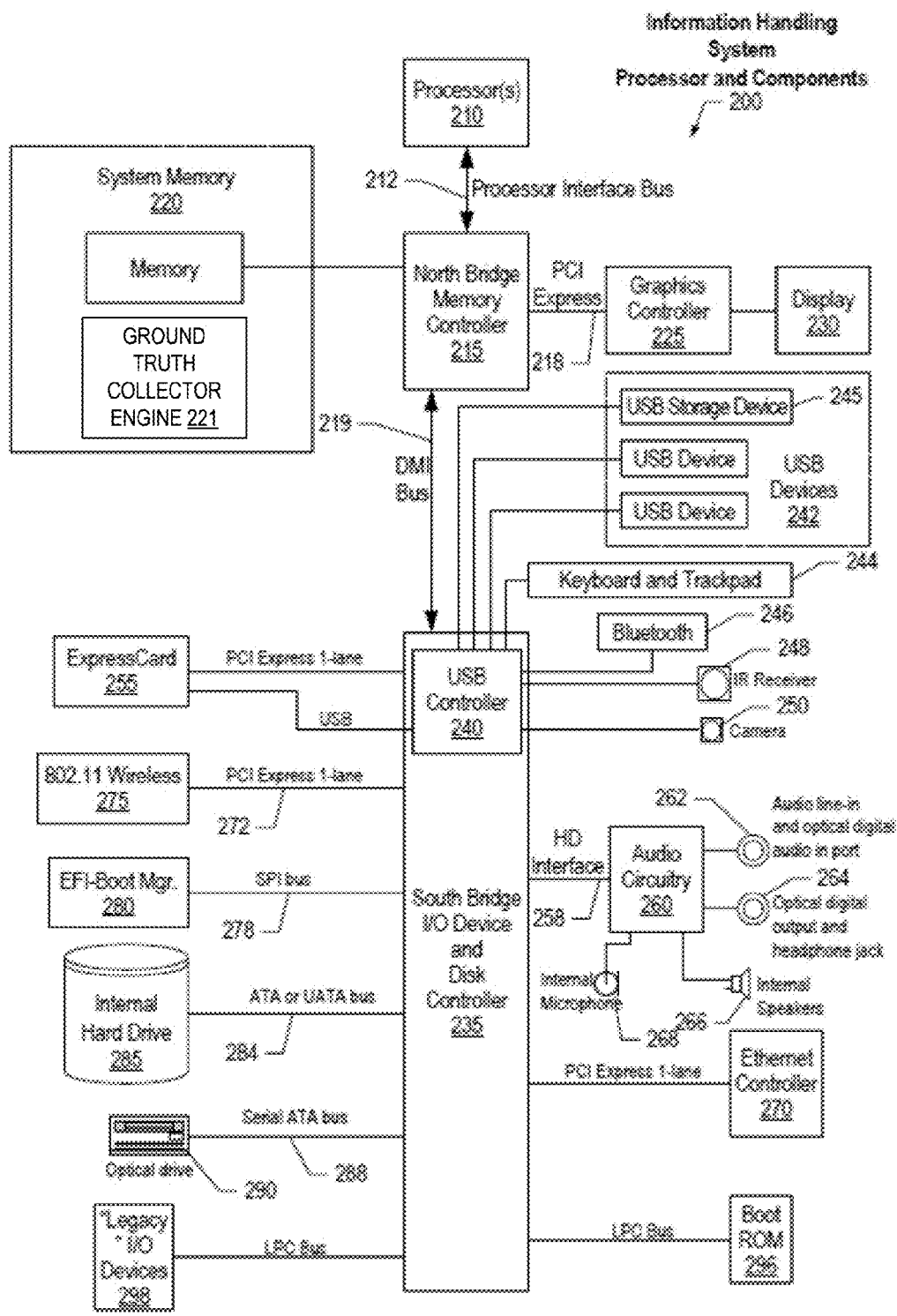
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including a ground truth collector engine module 221 which may be invoked to seamlessly generate ground truth data by providing a user-activated browser plugin to display an embedded data collection window overlay for any website that can be used to collect one or more associated questions, answers, passages and sentences from the website to be assembled and returned as ground truth data for use in training and evaluating a computing system (e.g., an IBM Watson™ QA system). Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
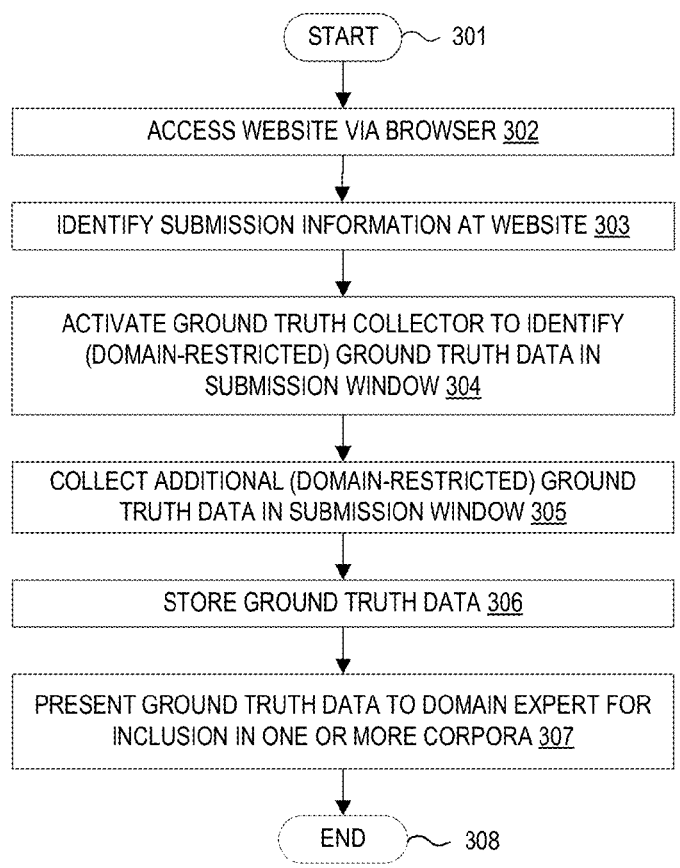
FIG. 3 illustrates a simplified flow chart showing the logic for collecting ground truth data for submission to one or more corpora used by a QA system.

FIG. 3 depicts an approach that can be executed on an information handling system to identify and collect ground truth data for use in training a QA system, such as QA system 101 shown in FIG. 1, to answer questions. This approach can be implemented at the computing system 17 or the QA system 101 shown in FIG. 1, or may be implemented as a separate computing system, method, or module. Wherever implemented, the disclosed ground truth collection scheme efficiently generates ground truth data using a browser-based submission window to efficiently collect question, answer, and/or source data from a browser-accessed website in combination with user-entered data. The ground truth collection processing may include providing a browser plugin to effectively embed a ground truth overlay into any accessed web site that users can activate (e.g., by clicking a button) and use to highlight passages for delivery to the ground truth store, alone or in combination with additional question and source information which may be automatically generated and/or entered by the user. With the disclosed ground truth collection scheme, an information handling system can be configured to identify and collect ground truth data in the form of QA pairs and associated source passages for use in training the QA system.

To provide additional details for an improved understanding of selected embodiments of the present disclosure, reference is now made to FIG. 3 which depicts a simplified flow chart 300 showing the logic for collecting ground truth data for submission to one or more corpora used by a QA system. The processing shown in FIG. 3 may be performed by a cognitive system, such as the first computing system 17, QA system 101, or other natural language question answering system.

FIG. 3 processing commences at 301 whereupon, at step 302, a user accesses a website, such as an Internet website or a forum type web site, such as Stack Overflow. As described herein, the website access step 302 may be performed before or after activation of the ground truth collector tool. For example, a user at a computing device may launch a browser or other search engine to locate information on a website independently of any ground truth collection effort or as part of a ground truth collection effort (e.g., upon determining that a ground truth store does not include an answer for a question). The processing at step 302 may be performed at the first computing system 17, the QA system 101 or other NLP question answering system. In selected embodiments where the user is looking for answers to a question, the user may enter the question into the browser's search engine to generate search results.

Using any desired user interface tools (e.g., display, cursor, keyboard, etc.), the user may navigate the displayed search results to identify submission information at an accessed website at step 303. For example, the user may determine that the accessed website contains answer information relating to an unanswered question, such as by reading the answer information on the website. In addition or in the alterative, a Natural Language Processing (NLP) routine may be used to identify FAQ-style QA pairs on the accessed webpage as candidate submission information to be considered by the user. In such cases, the identification of submission information at step 303 can be restricted or scoped to a specified domain. In addition, the identification of submission information at step 303 can be driven or prompted by setup data from a QA system which presents the user with a list of unanswered questions or which notifies the user that the accessed webpage may include answer information for an unanswered question or for an answered question, depending on specified user preferences. The setup data from the QA system can be used to identify whether an accessed webpage has already been used by another user, in which case the other user's annotated passages can be highlighted and/or identified with identification information for the other user(s). The identified submission information may also relate to one or more answers from the ground truth store which need to be validated (or contradicted) by answer information on the accessed website. The processing at step 303 may be performed at the first computing system 17, the QA system 101 or other NLP question answering system.

At step 304, the user may activate the ground truth collector to identify ground truth data using a submission window. For example, ground truth collector may be activated by clicking a browser plugin button to open an embedded iframe submission window in the browser to manually enter question, answer, and/or source passage information as needed. As disclosed herein, the processing at step 304 may be performed at the first computing system 17, the QA system 101 or other computing system on which a browser or search engine is run. In selected embodiments, the submission window may be automatically populated with text from the accessed webpage by activating a text selection function when the browser plugin button is clicked, allowing the user to select or highlight text from the accessed webpage by manipulating the cursor selection function for automatic insertion into a predetermined field (e.g., an answer field) of the submission window. With this arrangement, the browser plugin button effectively embeds a ground truth overlay into any accessed web site that users can activate (e.g., by clicking on the button) and use to highlight passages for delivery to the ground truth store. As indicated with the parenthetical reference in step 305, the identification of ground truth data may be restricted to a specified or limited domain when activating the ground truth collector, thereby directing the data collection efforts to specified domains if desired. Upon activation at step 304, the ground truth collector may be configured to make suggestion to a user, such as a subject matter expert (SME), based on the user's area of expertise which can be configured manually via preferences or inferred by the tool via cognitive algorithms which are adapted to detect SME habits (e.g., type of site being navigated to, type of previous answer key submission).

At step 305, additional ground truth data may be collected in the submission window. For example, the submission window may include one or more additional fields, such as a "question" field or "source" field that may be filled in automatically and/or by hand to collect additional ground truth data. For example, activated ground truth collector may automatically load the "source" field with address information for the accessed website. In addition, the user may enter or choose a suitable question for entry in the "question" field as needed. As disclosed herein, the processing at step 305 may be performed at the first computing system 17, the QA system 101 or other computing system on which a browser or search engine is run. In addition or as an alternative to using the submission window, the user may enter a document link or attach a document as part of the ground truth data.

At step 306, the ground truth data is stored. For example, a first computing system (e.g., computing system 17) may store the collected ground truth data 19 in the memory/database storage 18. When ready, the user can send the assembled ground truth data 19 via a direct connection 103 and/or network (e.g., a network 180 including, but not limited to Intranet, Internet, Wireless communication network, Wired communication network, Satellite communication network, etc.) to a second computing system for storage in the ground truth data 109. For example, the second computing system may be embodied, but is not limited to, an artificial intelligent computer, Watson™ computer (trademark of International Business Machine, Inc. Armonk, N.Y.), etc. In selected embodiments, the first computing system and the second computing system are two different computing systems. In other embodiments, the first computing system and the second computing system are a single computing system. An artificial intelligent computer refers to an intelligent computing system adapted to perform a question answering (QA), natural language processing, data retrieval, logical reasoning, machine learning, etc.

At step 307, a domain expert or system knowledge expert can review and evaluate proposed ground truth submissions for inclusion in one or more corpora. With the submitted ground truth data, the one or more targeted corpora can be updated with a document or document link generated with the collected ground truth data. In addition, the evaluated ground truth data can be used to train QA systems, such as by having a subject matter expert (SME) present ground truth data in the form of question-answer-passage (QAP) triplets or answer keys to a machine learning algorithm. Alternatively, the ground truth data can be used for blind testing by dividing the ground truth data into separate sets of questions and answers so that a first set of questions and answers is used to train a machine learning model by presenting the questions from the first set to the QA system, and then comparing the resulting answers to the answers from a second set of questions and answers.

After using the ground truth collection process 300 to identify, collect, and evaluate ground truth data, the process ends at step 308 until such time as the user reactivates the ground truth collection process 300 with another session. Alternatively, the ground truth collection process 300 may be reactivated by the QA system which monitors source documents to detect when updates are available. For example, when a new document version is available, the QA system may provide setup data to the ground truth collector engine 16 to prompt the user to re-validate the document for re-ingestion into the corpus if needed. In other embodiments where the QA system links multiple documents together by virtue of answering the same question, the QA system can monitor these documents atomically to detect if an answer from one document changes, in which case an indication is generated that the other documents may be out of date, requiring re-validation.

Figure 4A:
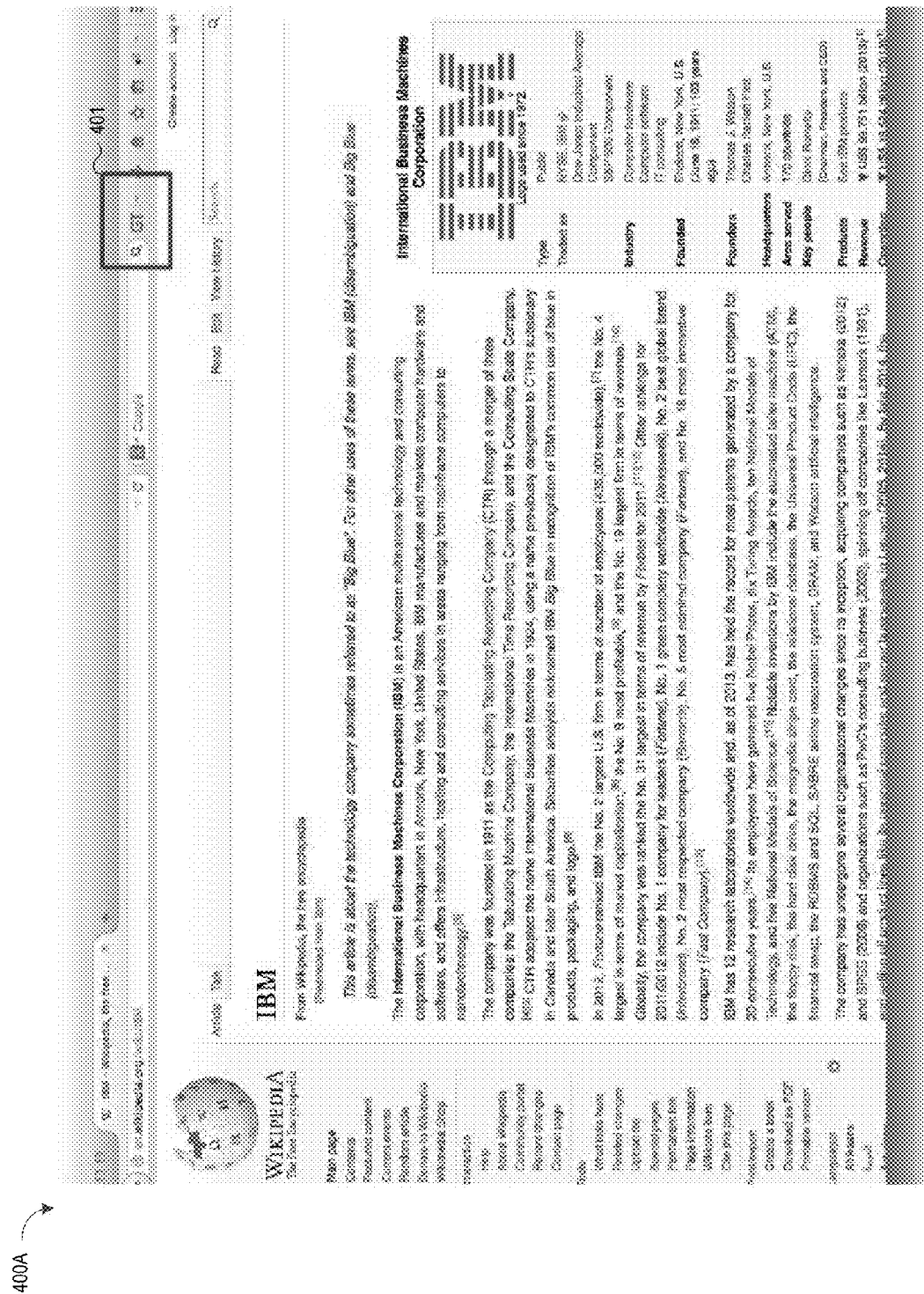
FIGS. 4A-D illustrate a sequence of example screen shots used in connection with collecting ground truth data using a browser-based ground truth collection tool.

To illustrate additional details of selected embodiments of the present disclosure, reference is now made to FIG. 4A which illustrates a first example screen shot 400A used in connection with a browser-based ground truth data collection sequence. As indicated with the first screen shot 400A, a user has accessed a website (e.g., en.wikipedia.org/wiki/IBM) which displays information to the user/viewer (e.g., a Wikipedia description of the technology company, IBM). The website page may be accessed by using a browser search engine running on the user's computer as an embedded ground truth collector browser plugin or independently thereof. As shown in the first screenshot 400A, the browser plugin configures the browser toolbar to include a ground truth (GT) collector activation button 401 which may be activated or selected by the user, such as by moving the display cursor to click the button 401.

Figure 4B:
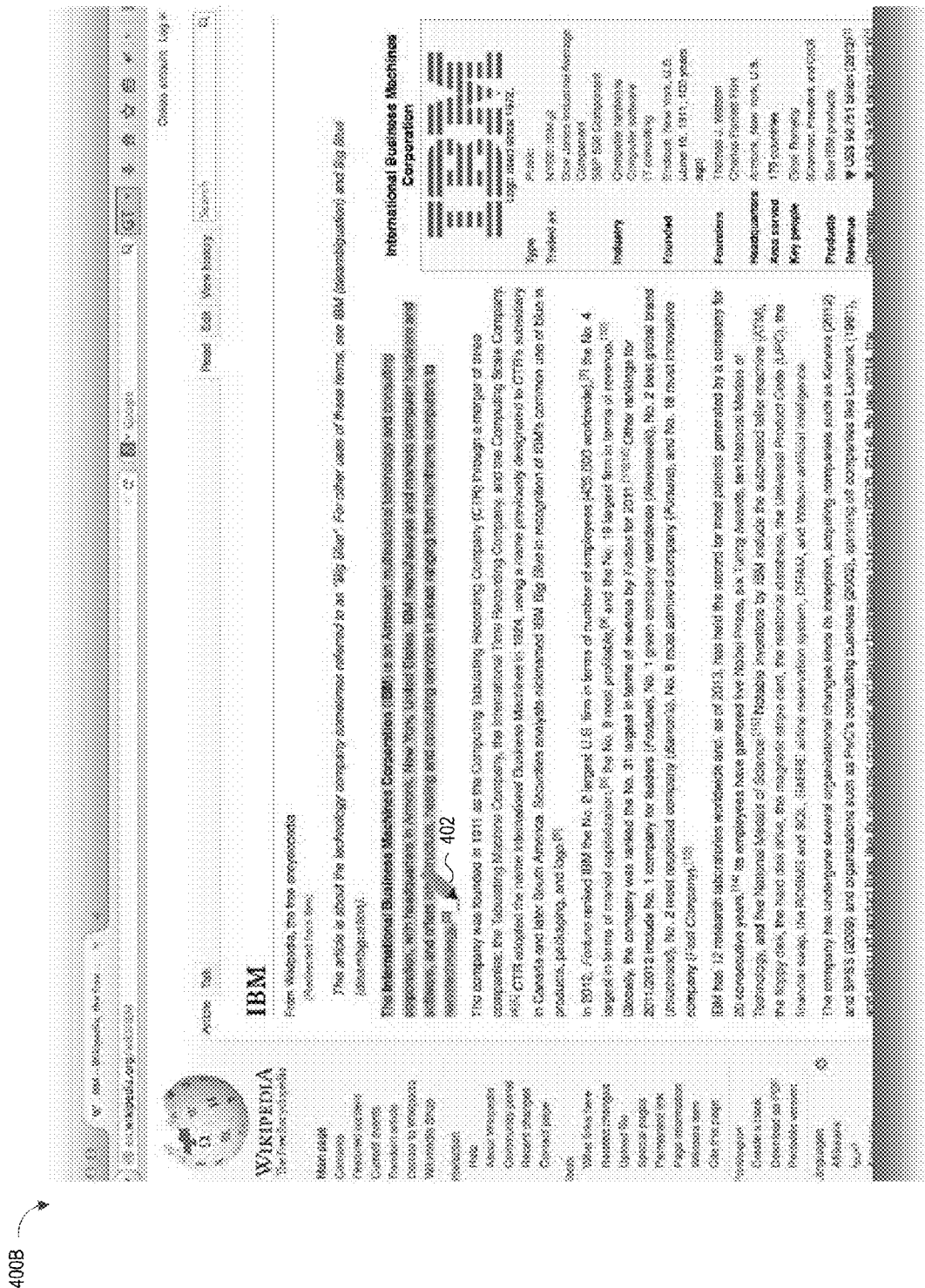

Upon activation of the button 401, the browser plugin may be configured to automatically and/or manually collect ground truth data related to the accessed website. For example, reference is now made to FIG. 4B which illustrates a second example screen shot 400B used in the depicted browser-based ground truth data collection sequence where the browser plugin provides a text selection tool for automatically feeding the selected text and associated source information into predetermined answer and source fields of a ground truth submission window. As indicated with the second screen shot 400B, the activated browser plugin may activate a text selection or highlight cursor 402 which the user manipulates to select or highlight a specific text passage from the accessed website.

Figure 4C:
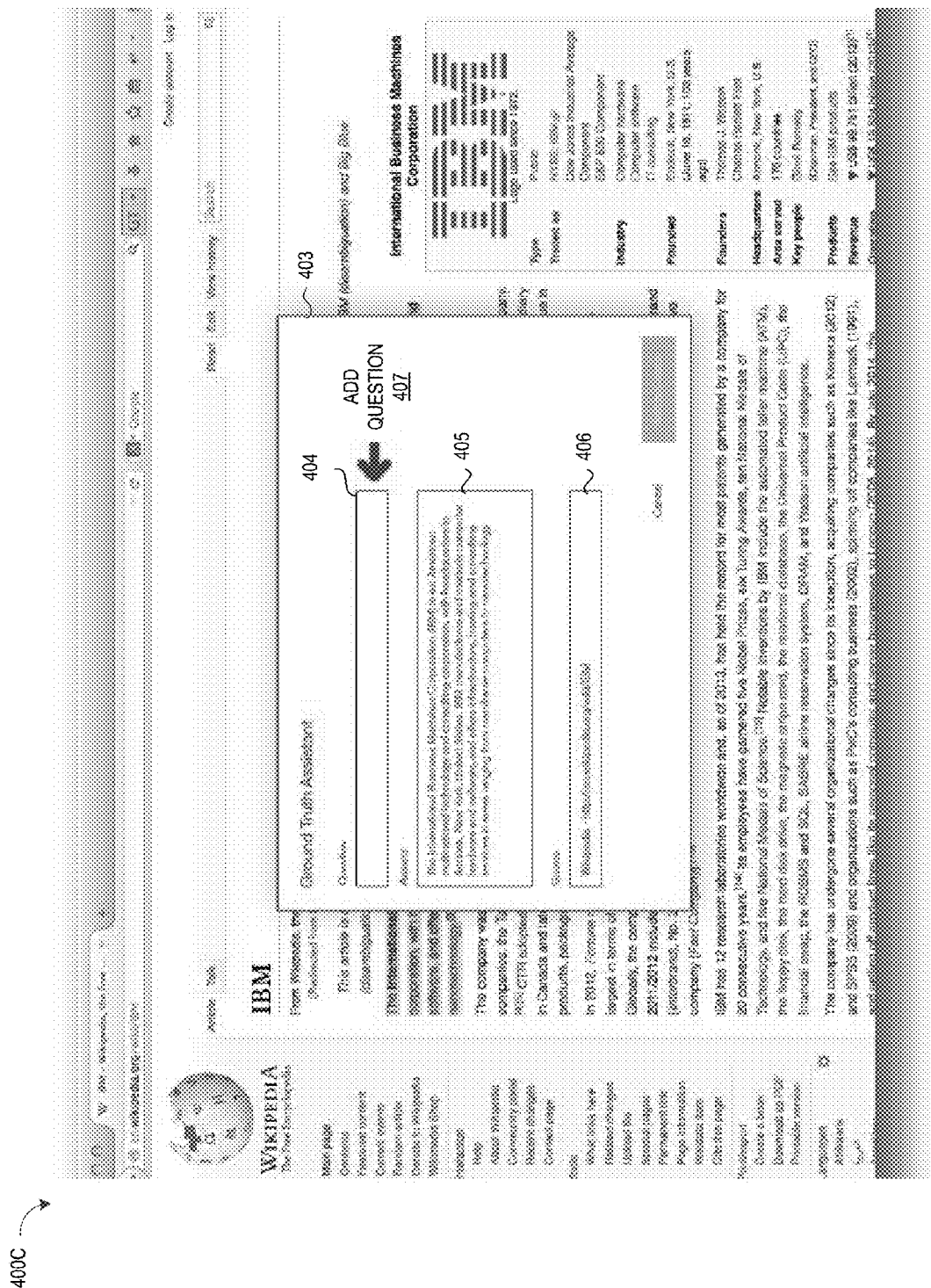

Once website information is selected or identified, the browser plugin may be configured to open a submission window for collecting ground truth data from the accessed website. For example, reference is now made to FIG. 4C which illustrates a third example screen shot 400C used in the depicted browser-based ground truth data collection sequence to automatically collect the selected text from the accessed website into a ground truth submission window 403. As depicted, the ground truth submission window 403 may include one or more predetermined data fields, such as a Question field 404, Answer field 405, and/or Source field 406. In selected embodiments, the browser plugin is configured to automatically populate the Answer field 405 and Source field 406, respectively, with the selected text and associated source information from the accessed website (e.g., Wikipedia—https://en.wikipedia.org/wiki/IBM). In addition, the browser plugin may be configured to include an "Add Question" prompt 407 in the submission window 403 which prompts the user to enter question text (e.g., "What is IBM?") into the Question field 404 that is suitably paired with the selected text and source information.

Figure 4D:
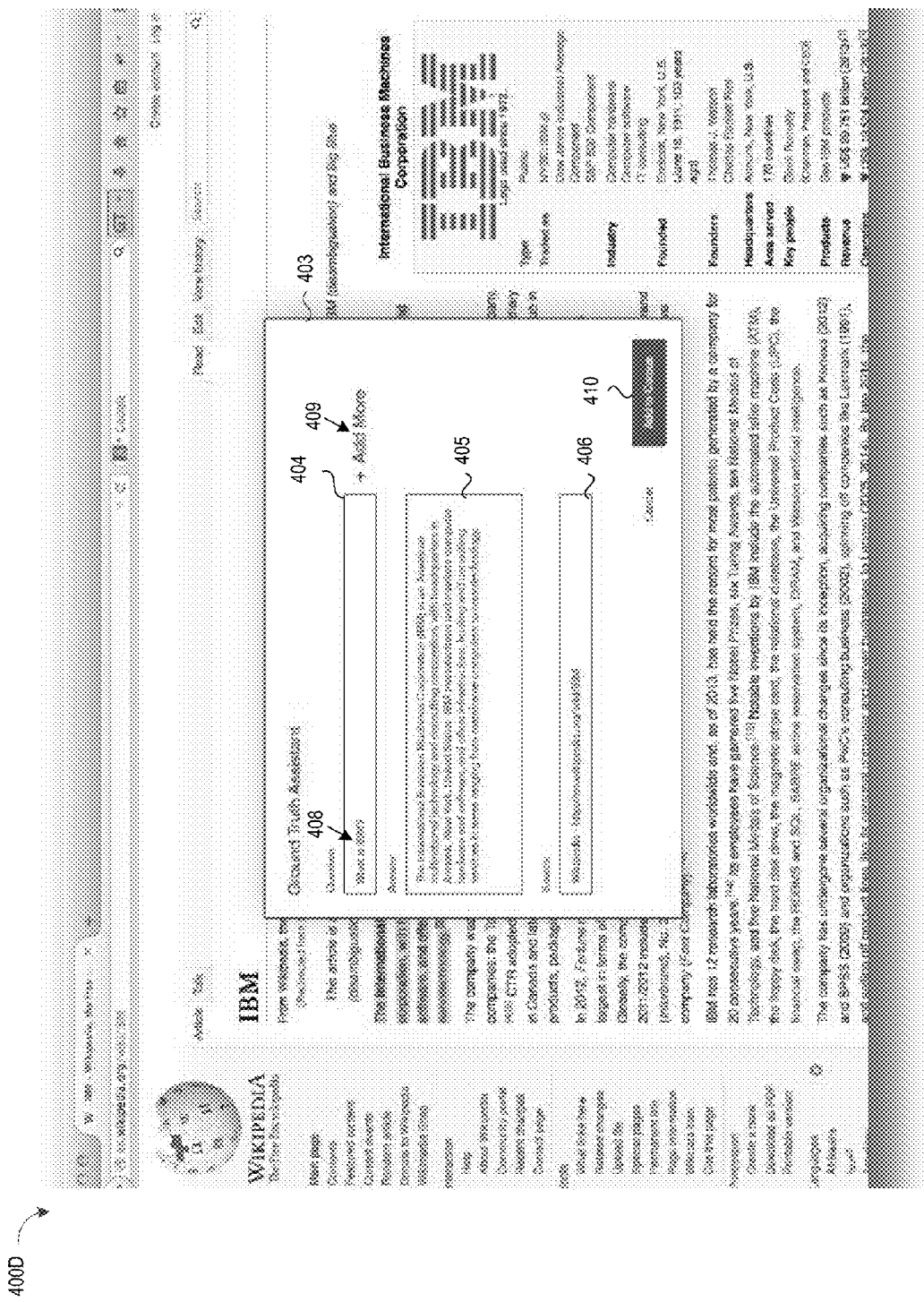

Once the ground truth data (e.g., question-answer-source data) is collected into the submission window 403, the browser plugin may be configured to activate additional submission window functionality for collecting ground truth data from the accessed website. For example, reference is now made to FIG. 4D which illustrates a fourth example screen shot 400D used in the depicted browser-based ground truth data collection sequence to supplement and store the collected ground truth data into the corpus. As depicted, the ground truth submission window 403 may include one or more field prompts, such as an "Add More" prompt 409 in the submission window 403 which prompts the user to enter an additional question into the Question field 404 that is suitably paired with the selected text and source information. In addition, the ground truth submission window 403 may include a store button 410, such as an "Add to Corpus" button 410 for storing the ground truth data.

By now, it will be appreciated that there is disclosed herein a system, method, apparatus, and computer program product for collecting ground truth data at a first information handling system having a processor and a memory. As disclosed, the system, method, apparatus, and computer program product may use a browser search engine to display search results in a browser display window, one of which may be selected to display webpage data that is retrieved from a first website by a user. In connection with the webpage data displayed in the browser display window, a ground truth collection browser plugin may be activated, such as by manipulating a display cursor to click on a ground truth collector toolbar button on the browser display window. In other embodiments, the ground truth collection browser plugin may be activated by receiving setup data from a second information handling system identifying a question from a ground truth store which may be answered from the webpage data. In other embodiments, the activation of the ground truth collection browser plugin may include processing the webpage data with a natural language processing (NLP) computer system to identify question-answer pairs in the webpage data. Upon activation of the ground truth collection browser plugin, answer data from the webpage data may be received, where the answer data may include a data passage that is selected by the user. In selected embodiments, the answer data may be received by activating a highlight selection tool for the user to highlight the data passage in the webpage data. In addition, a ground truth submission window may be generated with the answer data loaded into at least an answer field of the ground truth submission window, and with source data for the first website loaded into at a source field of the ground truth submission window. In addition, user input question data corresponding to the answer data may also be received and loaded into a question field of the ground truth submission window. Upon completion of data entry, the user input question data and answer data from the ground truth submission window are stored as ground truth data, and may also be transmitted to a second information handling system for evaluation by a subject matter expert.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of collecting ground truth data, the method comprising:
   displaying, by a first information handling system comprising a processor and a memory, webpage data in a browser display window, where the webpage data is retrieved from a first website by a user;
   activating, at the first information handling system, a ground truth collection browser plugin;
   receiving, by the first information handling system, user-selected answer data from the webpage data, wherein the answer data is not associated with a question and comprises a data passage that is selected by the user;
   generating, by the first information handling system, a ground truth submission window with the answer data loaded into at least an answer field of the ground truth submission window;
   receiving, by the first information handling system, user input question data corresponding to the answer data for loading into a question field of the ground truth submission window; and
   storing, by the first information handling system, the user input question data and answer data from the ground truth submission window as ground truth data.

2. The method of claim 1, further comprising executing, by the first information handling system, a browser search engine to display search results in the browser display window, one of which corresponds to the webpage data.

3. The method of claim 1, where activating the ground truth collection browser plugin comprises manipulating a display cursor at the first information handling system to click on a ground truth collector toolbar button on the browser display window.

4. The method of claim 1, where activating the ground truth collection browser plugin comprises receiving setup data from a second information handling system identifying an unanswered question from a ground truth store.

5. The method of claim 1, further comprising processing the webpage data with a natural language processing (NLP) computer system at the first information handling system to identify question-answer pairs in the webpage data.

6. The method of claim 1, where receiving answer data comprises activating a highlight selection tool for highlighting the data passage in the webpage data.

7. The method of claim 1, where generating the ground truth submission window comprises generating, by the first information handling system, the ground truth submission window with source data for the first website loaded into at a source field of the ground truth submission window.

8. The method of claim 1, further comprising transmitting, by the first information handling system, the ground truth data to a second information handling system for evaluation by a subject matter expert.

9. An information handling system comprising:
one or more processors;
a memory coupled to at least one of the processors;
a set of instructions stored in the memory and executed by at least one of the processors to collect ground truth data, wherein the set of instructions are executable to perform actions of:
activating, at the first information handling system, a ground truth collection browser plugin;
receiving, by the first information handling system, user-selected answer data from the webpage data, wherein the answer data is not associated with a question and comprises a data passage that is selected by the user;
generating, by the first information handling system, a ground truth submission window with the answer data loaded into at least an answer field of the ground truth submission window;
receiving, by the first information handling system, user input question data corresponding to the answer data for loading into a question field of the ground truth submission window; and
storing, by the first information handling system, the user input question data and answer data from the ground truth submission window as ground truth data.

10. The information handling system of claim 9, wherein the set of instructions are executable to activate the ground truth collection browser plugin by manipulating a display cursor at the first information handling system to click on a ground truth collector toolbar button on the browser display window.

11. The information handling system of claim 9, wherein the set of instructions are executable to activate the ground truth collection browser plugin by receiving setup data from a second information handling system identifying an unanswered question from a ground truth store.

12. The information handling system of claim 9, wherein the set of instructions are executable to process the webpage data with a natural language processing (NLP) computer system at the first information handling system to identify question-answer pairs in the webpage data.

13. The information handling system of claim 9, wherein the set of instructions are executable to receive answer data by activating a highlight selection tool for highlighting the data passage in the webpage data.

14. The information handling system of claim 9, wherein the set of instructions are executable to generate the ground truth submission window by generating, by the first information handling system, the ground truth submission window with source data for the first website loaded into at a source field of the ground truth submission window.

15. The information handling system of claim 9, wherein the set of instructions are executable to transmit, by the first information handling system, the ground truth data to a second information handling system for evaluation by a subject matter expert.

16. A computer program product stored in a non-transitory computer readable storage medium, comprising computer instructions that, when executed by an information handling system, causes the system to collect ground truth data by performing actions comprising:
displaying, by a first information handling system comprising a processor and a memory, webpage data in a browser display window, where the webpage data is retrieved from a first website by a user;
activating, at the first information handling system, a ground truth collection browser plugin;
receiving, by the first information handling system, user-selected answer data from the webpage data, wherein the answer data is not associated with a question and comprises a data passage that is selected by the user;
generating, by the first information handling system, a ground truth submission window with the answer data loaded into at least an answer field of the ground truth submission window;
receiving, by the first information handling system, user input question data corresponding to the answer data for loading into a question field of the ground truth submission window; and
storing, by the first information handling system, the user input question data and answer data from the ground truth submission window as ground truth data.

17. The computer program product of claim 16, wherein activating the ground truth collection browser plugin comprises manipulating a display cursor at the first information handling system to click on a ground truth collector toolbar button on the browser display window.

18. The computer program product of claim 16, wherein activating the ground truth collection browser plugin comprises receiving setup data from a second information handling system identifying an unanswered question from a ground truth store.

19. The computer program product of claim 16, further comprising computer instructions that, when executed by the information handling system, causes the system to process the webpage data with a natural language processing (NLP) computer system at the first information handling system to identify question-answer pairs in the webpage data.

20. The computer program product of claim 16, wherein receiving answer data comprises activating a highlight selection tool for highlighting the data passage in the webpage data.

21. The computer program product of claim 16, wherein generating the ground truth submission window comprises generating, by the first information handling system, the ground truth submission window with source data for the first website loaded into at a source field of the ground truth submission window.

* * * * *